United States Patent [19]

Litherland et al.

[11] 4,062,690

[45] Dec. 13, 1977

[54] COATING COMPOSITIONS FOR GLASS FIBRES

[75] Inventors: Kenneth Leslie Litherland, Ormskirk; Phillip Maguire, Liverpool; Colin Jones Cheetham, Ormskirk, all of England

[73] Assignee: Pilkington Brothers Limited, St. Helens, England

[21] Appl. No.: 646,082

[22] Filed: Jan. 2, 1976

[30] Foreign Application Priority Data

Jan. 2, 1975 United Kingdom ............... 88/75

[51] Int. Cl.$^2$ ............................................. C04B 7/02
[52] U.S. Cl. ...................................... 106/98; 106/50; 106/99
[58] Field of Search ............. 106/50, 99, 98; 260/38, 260/54, 50

[56] References Cited

U.S. PATENT DOCUMENTS

| | | | |
|---|---|---|---|
| 2,437,710 | 3/1948 | Rhodes | 260/54 |
| 2,524,079 | 10/1950 | Rhodes | 260/54 |
| 2,675,881 | 5/1954 | Cardwell | 260/54 X |
| 2,703,792 | 3/1955 | Kropa | 260/54 |
| 3,445,431 | 5/1969 | Nelson | 260/54 X |
| 3,736,162 | 5/1973 | Chvalovsky | 106/99 |
| 3,839,270 | 10/1974 | Wilkinson et al. | 106/99 |
| 3,861,926 | 1/1975 | Irlam et al. | 106/99 X |
| 3,954,490 | 5/1976 | Cockram | 106/99 |

*Primary Examiner*—Patrick P. Garvin
*Assistant Examiner*—John F. Niebling
*Attorney, Agent, or Firm*—Sughrue, Rothwell, Mion, Zinn and Macpeak

[57] ABSTRACT

A coating composition for glass fibres intended for use as reinforcement in cementitious products is disclosed, which contains at least one monocyclic or polycyclic aromatic compound having at least three hydroxyl groups on the aromatic ring or (in a polycyclic compound) on at least one of the aromatic rings, together with at least one partially-cured A-stage phenolformaldehyde resin of the water-dilutable resole type.

14 Claims, 4 Drawing Figures

COATING COMPOSITIONS FOR GLASS FIBRES

CROSS-REFERENCE TO RELATED APPLICATION

This invention is related to those disclosed and claimed in application Ser. No. 485,659 filed July 3, 1974 by David Ralph Cockram and assigned to Pilkington Brothers Limited, now issued as U.S. Pat. No. 3,954,490, and its Divisional application Ser. No. 646,785 filed Jan. 6, 1976.

BACKGROUND OF THE INVENTION

1. Field of the Invention

This invention relates to coating compositions for glass fibres, more particularly glass fibres which are intended for use as reinforcement in cement products, and is related to the invention described and claimed in U.S. Pat. No. 3,958,490 and application Ser. No. 646,785, assigned to the same assignee as the present invention.

2. Description of the Prior Art

In the alkaline environment of a normal Portland cement, which is mainly due to the presence of lime (calcium hydroxide), fibres of generally available glass compositions, such as that widely known as E-glass, are rapidly attacked and weakened so that the additional strength imparted to the cement by the glass fibres is rapidly lost.

Various alkali-resistant glass compositions have been devised which retain their strength better in cement.

Thus British patent specification No. 1,200,732 (National Research Development Corporation) describes and claims a composite fibre/cementitious product comprising fibrous reinforcing material distributed throughout a cement matrix, in which the reinforcing material is primarily a glass having per se a degree of alkali resistance such that when tested in the form of an abraded fibre of length 2½ inches and a diameter of from 0.4 to 1.0 × 10$^{-3}$ inches said fibre has a tensile strength of at least 100,000 p.s.i. after treatment with saturated aqueous Ca(OH)$_2$ solution at 100° C for 4 hours followed by successive washings at ambient temperature with water, then with aqueous hydrochloric acid (1%) for 1 minute, water, acetone, followed by drying, said fibre experiencing not more than 10% reduction in diameter during said test.

British patent specification No. 1,243,972 (N.R.D.C.) discloses and claims such composite fibre/cementitious products in which the glass contains at least 65% SiO$_2$ and at least 10% ZrO$_2$ by weight. British patent specification No. 1,243,973 (N.R.D.C.) discloses and claims alkali-resistant glass fibres derived from a glass containing, in weight percentages, 65 - 80% SiO$_2$, 10 - 20% Zro$_2$ and 10 - 20% of a network modifier which is an alkali metal oxide, an alkaline earth metal oxide or zinc oxide, said glass being one which has a tensile strength as set out above.

Further ranges of glass compositions for forming alkali-resistant glass fibres are disclosed and claimed in our British Patent Specifications Nos. 1,290,528 and 1,389,019. Patent No. 1,290,528 claims glass compositions for forming glass fibres which are to be incorporated as reinforcement in cementitious products, comprising, in molecular weight percentages:

SiO$_2$: 62% to 75%
ZrO$_2$: 7% to 11%
R$_2$O: 13% to 23%
R'O: 1% to 10%
Al$_2$O$_3$: 0% to 4%
B$_2$O$_3$: 0% to 6%
Fe$_2$O$_3$: 0% to 5%
CaF$_2$: 0% to 2%
TiO$_2$: 0% to 4% wherein R$_2$O represents Na$_2$O, up to 2 mol.% of which may be replaced by Li$_2$O, and R'O is an oxide selected from the group consisting of the alkaline earth metal oxides, zinc oxide (ZnO) and manganous oxide (MnO), the balance if any consisting of other compatible constituents.

U.S. Pat. No. 1,389,019 claims glass compositions for forming into alkali-resistant continuously-drawn glass fibres, comprising in molar percentages on the oxide basis:

SiO$_2$: 67 to 82
ZrO$_2$: 7 to 10
R$_2$O: 9 to 22.5
F$_2$: 3 to 9
Al$_2$O$_3$: 0 to 5

(computed as AlO$_{1.5}$)

the balance, if any, consisting of other compatible constituents, where R = Na, up to 5 mol.% of which may be replaced by Li or K, and fluorine is included in substitution for oxygen in one or more of the oxides, the maximum value of the molar percentage represented by SiO$_2$ + ZrO$_2$ + AlO$_{1.5}$ being dependent linearly on the content of both ZrO$_2$ and F$_2$, ranging, when F$_2$ = 9 mol.%, from 89 mol.% when the ZrO$_2$ content is 7 mol.% to 88 mol.% when the ZrO$_2$ content is 8.5 mol.%, down to 87 mol.% when the ZrO$_2$ content is 10 mol.%, the said maximum value being reduced by a further 5 mol.% over the whole scale when F$_2$ = 3 mol.%.

U.S. Pat. No. 3,840,379 (Owens-Corning Fiberglas Corporation) describes another range of alkali-resistant glasses, and glass fibres made from them, having compositions within the following range:

|  | Weight Percent | | | Mol.Percent | | |
|---|---|---|---|---|---|---|
| SiO$_2$ | 60 | to | 62 | 65 | to | 67 |
| CaO | 4 | to | 6 | 4.5 | to | 6.5 |
| Na$_2$O | 14 | to | 15 | 14.5 | to | 16 |
| K$_2$O | 2 | to | 3 | 1 | to | 2.5 |
| ZrO$_2$ | 10 | to | 11 | 5 | to | 6 |
| TiO$_2$ | 5.5 | to | 8 | 4.5 | to | 6.5 |

Although alkali-resistant glass fibres as described in the above Patent Specifications retain their strength in cement much better than fibres of conventional glasses, such as E-glass, there is nevertheless, a gradual deterioration over long periods.

When producing glass fibres for any purpose, it is normal practice to coat the individual, continuously-drawn glass fibres, immediately after drawing, with a size composition which provides a mechanical protection and a lubricant for the fibres to minimise breakage and abrasion during the subsequent processing, namely the bringing together of numerous individual fibres to form a strand and the winding of the strand on a spool or drum. The size compositions previously used on glass fibres to be included in a cementitious matrix do not have any material effect on the long term resistance of the glass to attack by the alkalis in cement.

Protective coating compositions have also been applied to glass fibres at various stages in their production and processing, and it has, for example, been proposed to use a furane resin in such a coating for increasing the alkali resistance of the glass fibre material to render it suitable for use in reinforcing concrete.

U.S. Pat. No. 3,954,490 describes a composition for coating glass fibres intended for use as reinforcement in cementitious products, containing, as a protective material, at least one monocyclic or polycyclic aromatic compound which has at least three hydroxyl groups on the aromatic ring or (in a polycyclic compound) on at least one of the aromatic rings, said composition, when applied to a strand of glass fibres which is subsequently encased in a block of ordinary Portland cement paste which is allowed to cure and kept for 28 days in water at 50° C, producing an improvement of at least 10% in the tensile strength of the strand as compared with that of a strand similarly treated and tested but without application of said composition.

SUMMARY OF THE INVENTION

While the coating compositions described in U.S. Pat. No. 3,954,490 produce a substantial improvement in the ability of the coated fibres to retain their strength in the alkaline environment of a cement matrix, we have now found that I can produce a further improvement by incorporating an A-stage phenol-formaldehyde resole resin with the polyhydroxy aromatic compound.

Accordingly the present invention provides a composition for coating glass fibres intended for use as reinforcement in cementitious products, containing, as a protective material, at least one monocyclic or polycyclic aromatic compound which has at least three hydroxyl groups on the aromatic ring or (in a polycyclic compound) on at least one of the aromatic rings, and at least one partially-cured A-stage phenol-formaldehyde resin of the water dilutable resole type. When such compositions are applied to a strand of glass fibres and cured at an elevated temperature, and the strand is subsequently encased in a block of ordinary Portland cement paste which is allowed to cure and subsequently kept for 28 days in water at 50° C, said composition produces an improvement of at least 10% in the tensile strength of the strand as compared with that of a strand similarly treated and tested but without application of said composition.

It is of course well known that resole resins are formed by the reaction of phenol and formaldehyde in the presence of an alkaline catalyst, and that the partially cured A-stage resins are water-dilutable.

It has been found that the dried coating which results on the glass fibres from the application of the coating composition of the present invention to the fibres, and its drying under conditions where the curing of the resole resin is completed or substantially completed, appears to reduce the immediate availability of the polyhydroxy aromatic compound to the aqueous phase of the cement matrix, i.e. the rate at which the polyhydroxy compound becomes available for reaction, when the fibres are incorporated in a cementitious mix.

Reducing the immediate availability of the polyhydroxy aromatic compound in this way has the effects of:
i. increasing the efficiency of use of the polyhydroxy aromatic compound by reducing loss of the polyhydroxy compound from the fibre surface during manufacture of the cementitious product; this loss has been found to be evident in such products made without the resole resin by spray-up techniques and would be extensive in such products made using the pre-mix techniques.
ii. reducing the retardant effect which the polyhydroxy aromatic compound has been found to exert on the setting characteristics of the cement.
iii. (resulting from (ii) improving the early development of strength of glass-reinforced cement composite materials made with the coated fibres.

It has been found that the use of the A-stage phenol-formaldehyde resole resin with the aromatic polyhydroxy compound as a protective material in a size or other coating composition in accordance with the invention substantially reduces the rate of deterioration in strength of the glass fibres when incorporated in cementitious products, over long test periods, as compared with fibres coated with conventional sizes. This effect is noticeable with the conventional E-glass fibres but a greater advantage is obtained with a glass which is already substantially alkali-resistant, i.e. which satisfies the tensile strength requirement specified in British patent specifications Nos. 1,200,723, 1,243,972 and 1,243,973 mentioned above. We prefer to use the coating composition of the invention with glass fibres which are formed from an alkali-resistant glass composition containing at least 5 mol % $ZrO_2$, and particularly an alkali-resistant glass composition as disclosed in our British patent specifications Nos. 1,290,528 and 1,389,019, which can be fiberised at conventional fiberising temperatures of around 1320° C and below.

Suitable resole resins for use in the present invention have been produced by reaction of 1 mol phenol with more than 1.5 moles formaldehyde in aqueous solution in the presence of an alkaline catalyst, typically with from 1.5 to 3.7 moles formaldehyde. Alkaline catalysts include amines, sodium hydroxide, calcium hydroxide and barium hydroxide. Desirable results have been achieved by use of a resole resin obtained by reaction of 1 mol phenol with 2 to 3 moles formaldehyde.

We believe it is important that the conditions under which the fibre is dried should be chosen so that the temperature is one at which curing can take place but such curing should not be such as to cause a loss in the trihydric character present in the coating composition before drying. We find that a temperature range of 115° to 180° C, and drying times of up to 12 hours, with resole resins of the kind referred to above, do not normally have any harmful effect on the ability of the coated fibre to withstand attack. With the resole resins mentioned above, having a phenol:formaldehyde ratio of 1:2 to 1:3, a drying temperature of 120° C to 160° C has been found to give desirable results.

Care should also be taken to check on the presence of free formaldehyde in the resin as this can in some circumstances reduce the availability of the polyhydroxy aromatic compound to levels where the level of improvement in durability is not of commercial significance. We have found that free formaldehyde levels of the order of 7% by weight in the resin before dilution can be tolerated.

We are not certain how far the improvement in performance due to reducing the immediate availability of the polyhydroxy aromatic compound to the aqueous phase of the cement matrix is due to actual reaction of the compound into the resole resin, or to it being merely trapped in the cured resole resin matrix, or a combination of both factors. However all our evidence to date indicates that the presence of the resole resin gives an improvement in performance of the fibres coated with the composition of the present invention over fibres coated with a size composition containing the same polyhydroxy aromatic compound but without any resole resin in the size composition.

Where the composition is intended to be applied as a size to the glass fibres immediately after they have been drawn from the molten glass composition, the resole resin will serve as a film-forming agent, and a linking agent such as a silane will normally also be incorporated in the size composition to assist in holding it on the surface of the glass fibres.

The size composition will normally be water-based and will further incorporate a wetting agent to assist dispersion of the resole resin in the aqueous size.

It is believed that the deterioration strength of glass fibres incorporated in cementitious products is closely connected with solution-phase reactions or processes at the glass surface, one example of which is the deposition of calcium hydroxide crystals from the saturated solution of calcium hydroxide present in the cementitious matrix at the interface between the glass and the cementitious matrix, and that one effect of the above mentioned polyhydroxy aromatic compounds in the coating composition is to inhibit or reduce such crystal formation. To produce this effect, it is believed to be advantageous for the aromatic compound to have at least a certain degree of solubility in a calcium hydroxide solution. Examination by stereoscan microscope of fibres which have been set in cement has also indicated that those fibres coated with compositions according to the invention, where attacked by the alkali in the cement, exhibit a considerably smoother etch pattern than that observed on fibres not so coated. This again could contribute to the higher strength retained by the coated fibres.

The polyhydroxy aromatic compound is preferably present in the coating composition in solution in a liquid carrier material, though it may alternatively be present as an emulsion or a finely divided suspension in such a material.

The classes of aromatic polyhydroxy compounds which have been found suitable for use in the protective material, as described in U.S. application Ser. No. 485,659, include:

a. Mono-cyclic 6-membered-ring aromatic compounds having at least three hydroxy groups substituted in the ring, e.g.

1, 2, 3 tri-hydroxy benzene (pyrogallol)
1, 2, 4 tri-hydroxy benzene (hydroxyhydroquinone)
1, 3, 5 tri-hydroxy benzene (phloroglucinol)

b. Mono-cyclic 6-membered-ring aromatic compounds having at least three hydroxyl groups and at least one other group substituted in the ring, and carboxylic acid salts and esters thereof, e.g.

2, 4, 6 tri-hydroxy benzaldehyde,
2, 3, 4 tri-hydroxy acetophenone
2, 4, 6 tri-hydroxy acetophenone
Tetrahydroxy-p-quinone dihydrate
2, 3, 4 tri-hydroxy benzoic acid
3, 4, 5 tri-hydroxy benzoic acid (gallic acid)
Propyl gallate
2, 4, 6 tri-hydroxy benzoic acid c. Products obtained by oxidation of compounds of classes (a) and (b) in alkaline solution, e.g.

Ammonium oxidation salt of pyrogallol

Ammonium oxidation salt of gallic acid d. A hetero-mono-cyclic 6-membered-ring aromatic compound having at least two nitrogen atoms within the ring and at least three hydroxyl groups as substituents in the ring, e.g.

2, 4, 6 tri-hydroxy pyrimidine (barbituric acid)

e. A polycyclic aromatic hydrocarbon having at least three hydroxyl groups substituted into a single 6-membered ring, e.g.

purpurogallin,
1, 2, 4 tri-hydroxy anthraquinone (purpurin),
2, 4, 6 tri-hydroxy benzophenone,
Tannic acid,
Naturally occurring vegetable tannins.

Many naturally occurring vegetable extracts contain chemical compounds having structures of the kind disclosed above, and can be used in the protective material in the coating compositions of this invention, e.g. quebracho bark, chestnut extract, suma extract, grape tannin, mimosa extract, and other materials falling in the general class of naturally occurring vegetable tannins.

In addition to possibly reacting with the resin, some of the compounds listed, such as pyrogallol, are oxidised by air when dissolved in an alkaline solution. Hence it is not to be expected that the aromatic polyhydroxy compounds will necessarily have their original composition when the coated fibres are incorporated in cement or even before they are incorporated. The products of atmospheric oxidation of ammonia solutions of pyrogallol and gallic acid (class (c) above) have been found effective for use in protective materials, indicating that such changes in composition do not affect the protective activity of the material, and we have had no indication that the presence of a resin changes these conclusions.

The concentration of the protective material required in the coating composition is dependent on several variables, and no exact limits can be stated which will encompass all the variables. The major factors to be considered in assessing the amount of protective material in the coating composition are as follows:

a. the protective material's solubility in the carrier material used,
b. the protective material's solubility in calcium hydroxide solution, and coupled with this the effectiveness of the particular compound being considered in reducing the rate of deterioration of the glass fibres in a cement matrix. Thus a compound of high effectiveness with a low solubility in calcium hydroxide solution may be effective at the same concentration as a compound of low effectiveness with high solubility in calcium hydroxide solution,
c. the cost of the protective material used. It may be economically more desirable to use less of a more effective high cost compound, than a larger quantity of a less effective lower cost compound,
d. the quantity of coating composition being picked up on the fibre during the coating process, which will determine the actual quantity of protective material present at the interface between the glass fibre and the cement matrix, e. the relative reactivity of the protective material with the phenolic resin present in the coating composition under chosen drying conditions.

In most cases a coating composition containing 5% by weight of protective material is effective, and it is unlikely that a coating composition containing more than 10% of protective material will be needed or economically feasible. However in a suitable carrier and with a highly effective compound concentrations of less than 1% could be feasibe. A suitable screening test for assessing the effectiveness of the compounds is referred to above and described below in more detail with reference to the example. Compounds may be ranked in order of effectiveness by reference to the percentage improvement found in the screening test, as compared with fibres coated in the same way as the fibres being tested except that no protective material is present in the coating composition. Compounds producing an improvement of less than 10% will not be considered suitable for use.

As indicated in our U.S. Application Ser. No. 485,659, in choosing a polyhydroxy aromatic compound from amongst the classes of aromatic compounds indicated as generally suitable above, care must be taken to ensure that substituent groups are not present in the molecule which counteract the protective activity of the three hydroxyl groups in reducing deterioration of the glass fibres, to such an extent as to make the compound unsuitable for use. It is therefore necessary, in selecting compounds for use, to carry out comparative screening tests where substituent groups are present, to ensure that these substituents have not reduced the protective activity to a level at which the rate of deterioration of the glass fibres is not materially reduced. The need to select suitable compounds and resins by screening tests equally applies in the use of a coating composition according to the present invention containing an A-stage phenol-formaldehyde resole resin. The screening test in this case must also take into account the possibility of counteracting the protective action of the three hydroxy groups by the reaction or interaction of the trihydroxy compound with the methylol groups present in the resole resin.

The invention also includes glass fibres for use as reinforcement in cement products, coated with a composition as described above. Preferably the glass fibres are formed from an alkali-resistant glass composition containing at least 5 mol.% $ZrO_2$.

The invention further includes cementitious products reinforced with coated glass fibres as described above.

The invention also resides in a method of coating glass fibres to reduce their rate of deterioration when incorporated in cementitious products, comprising applying to the glass fibres a coating composition as described above.

The invention also resides in a method of forming a glass fibre reinforced cementitious product, wherein glass fibres are coated with a composition as described above and are subsequently incorporated into a cementitious matrix.

DETAILED DESCRIPTION OF THE INVENTION

A-stage phenol-formaldehyde resole condensates or resins can be manufactured in well known manner. In this embodiment of the invention, the method of manufacture used was as follows, though the invention is not limited to the use of this particular method. The catalyst used was barium hydroxide, though sodium hydroxide or calcium hydroxide and other alkalis may be used.

Condensate

The mol ratio of reactants used was
1 mol phenol
2.05 moles formaldehyde
0.045 mole barium hydroxide pentahydrate In making up a batch of resin the following quantities of reactants were used
Phenol: 168 gallons
Formaldehyde 37% w/w: 284 gallons
Barium hydroxide pentahydrate: 230 lbs The catalyst was added to the phenol and formaldehyde mixture in a reaction kettle, and the temperature raised to 110° F for 2 hours. The temperature of the reaction mixture was then raised to 137° F for 2 hours and after that time to 147° F for 1 hour. The condensate formed was then cooled to 100° F for neutralisation.

The neutralisation of the alkaline catalyst can be carried out using a mineral acid, usually sulphuric acid, though other acidic materials can be used.

The choice of the mol ratio of phenol to formaldehyde is dictated by the need to produce a water-dilutable resin which does not contain excessive free formaldehyde. A wide range of molar ratios is usable, dependent on the actual reaction conditions, and a typical range may be from 1.5 to 3.7 moles formaldehyde to 1 mol phenol.

In general the condensation reaction is normally carried out by heating the reactants together under agitation, the heating being for several hours at a series of increasing temperatures e.g. two hours at 110° F, 2 hours at 137° F and finally 1 hour at 147° F. A suitable procedure described in British Patent Specification No. 952,690 is 3 hours at 110° F, 4 hours at 125° F, and 6 hours at 140° F. In the case where calcium hydroxide is used as a catalyst, due to the exothermic nature of the reaction, as described in British patent specification No. 1,285,938, the reactants without the catalyst may be first heated to about 100° F and then allowed to rise to 125° F over 60 minutes, the CaO being added over 15 minutes. The subsequent reaction conditions described in British patent specification No. 1,285,938 were then similar to those used with other catalysts.

For comparison with size compositions according to the present invention, a conventional size composition referred to hereinafter as size I was made up of the following constituents:

| | Weight % |
|---|---|
| Polyvinyl acetate of cationic character, namely a co-polymer of average molecular weight 80,000 derived from vinyl acetate and 2% of 2-dimethylamino ethyl methacrylate stabilised with 1% of a cationic surfactant, sold as "National 102-1209" by National Adhesives and Resins Ltd. | 14.0 |
| A pelargonic acid -tetraethylene pentamine condensate solubilised with acetic acid, sold as AHCO 185 AE by Arnold Hoffman | 0.02 |
| A caprylic acid-tetraethylene pentamine condensate solubilised with acetic acid, sold as AHCO 185 AN by Arnold Hoffman | 0.01 |
| A polyethylene glycol sold as "Carbowax 1000" by Union Carbide Corporation | 0.10 |
| δ-aminopropyltriethoxysilane, sold as "A 1100 silane" by Union Carbide | 0.25 |
| Water | to 100 |

The solids content of this size was between 6.5 and 7.0% by weight.

A size composition in accordance with the present invention, referred to as II, was made up as follows:

| | Weight | |
|---|---|---|
| Resole Resin (made as described under heading "Condensate" above) | 5.0 | (solids content) |
| Cationic wetting agent "Arquad 12/50" | 0.6 | |
| γ-aminopropyltriethoxysilane, a silane linking agent sold as "A1100 silane" by Union Carbide | 0.5 | |
| Pyrogallol (1, 2, 3 trihydroxybenzene) | 5.0 | |
| Acetic acid was added to give a pH of 4 to 4.5. | | |

A further size composition in accordance with the invention, referred to as III, was made up as size II but with 10% resole resin instead of 5%. Finally a size composition IV was made up as size I, without any resole resin but with the addition of 5 weight % pyrogallol, and thus in accordance with our co-pending British Application No. 31657/73, now published under U.K. Pat. No. 1,465,059.

Glass fibres of a composition in accordance with our U.K. Patent No. 1,290,528 having the following composition in mol.%:

| $SiO_2$ | 69% |
|---|---|
| $ZrO_2$ | 9% |
| $Na_2O$ | 15.5% |
| $CaO$ | 6.5% | were drawn continuously from a multi-tipped bushing and coated with these sizes, and combined into respective multi-filament strands. The size coating was then dried and cured at 135° C for 12 hours. The pick-up of size was approximately 2% by weight on the multi-filament strand after drying and curing. The strands were tested in the following manner:

Strands of the sized glass fibre were each encased in a small block of ordinary Portland cement paste, leaving the ends of the strand exposed, and the cement was allowed to cure. One day at 100% relative humidity and room temperature was sufficient to effect curing of the small blocks. The blocks were then stored in water at 50° C to produce accelerated ageing effects. After varying periods of storage the tensile strength of the strands was tested to investigate the change in strength over various periods of time. The results obtained are illustrated in FIG. 1 of the accompanying drawings.

Figure 1:
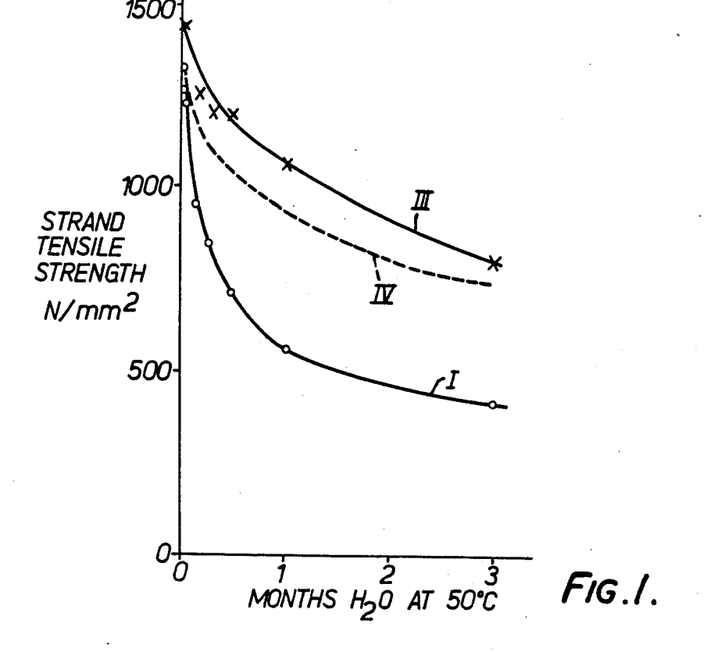
FIG. 1 is a graphical representation of the results of tests on the tensile strength of glass fibre strands embedded in cement, after varying periods of immersion in water at 50° C to produce accelerated ageing.

FIG. 1 shows the results obtained with the three sizes I, III and IV.

It can be clearly seen that the improvement in tensile strength achieved with strands of glass fibres coated with size III, in accordance with the invention, as compared with the strength of fibres sized with the conventional size I, after 28 days in water at 50° C, is well above the specified minimum of 10%. The strands of glass fibres coated with size III also show a relatively small but clear improvement in performance as regards overall durability, as compared with the strands of fibres coated with size IV in accordance with British Application No. 31657/73, now published under U.K. Pat. No. 1,465,059 though both are substantially better than the strands coated with known size I. This test, under extreme conditions, investigated the long-term durability of the fibre, and it seems possible that the improvement produced by utilising a phenol-formaldehyde resole resin in the size in addition to a polyhydroxy compound is relatively small compared with the improvement produced by use of the polyhydroxy compound alone, as regards long term durability.

Figure 2:
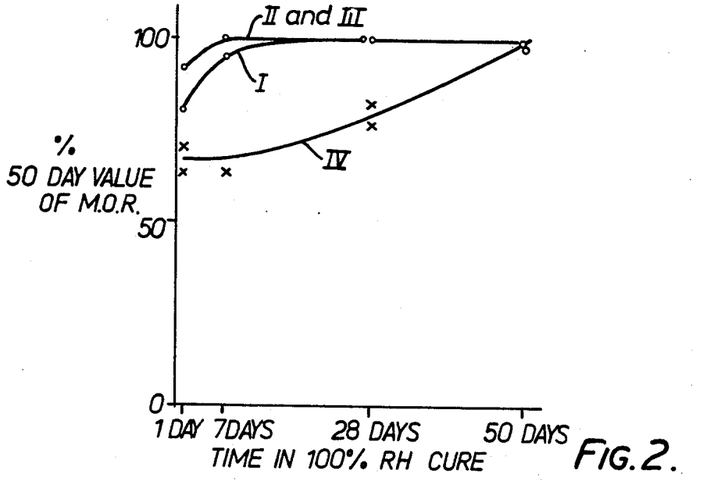
FIG. 2 is a graphical representation of the variation with time of the modulus of rupture of glass fibre reinforced cement composites, when cured in conditions of 100% relative humidity.

We believe that one important improvement arising from the use of the resole resin is that which results from reduction of the retardant effect of the polyhydroxy compound on the initial setting of the cement. For assessing this improvement, samples of glass-fibre-reinforced cement were made by forming four sets of boards of dimensions 2×1 metre by spraying chopped strands of glass fibres and cement from separate sources on to a mold surface, using fibres of the composition set out above, coated respectively with the four sizes described, and testing the boards for modulus of rupture after curing for varying times under conditions of 100% relative humidity and room temperature. The results are shown in FIG. 2, where, for each of the above sizes, we have plotted the build-up of flexural strength of the composite boards over 50 days in terms of the percentage of the 50 day value attained as a function of time. This enables one to bring together and compare results from different experiments in which differing 50-day values of modulus of rupture were obtained. FIG. 2 shows that when size IV is used there is considerable delay in the build-up of strength compared to the rate of build-up with sizes I, II and III. The incorporation of the phenol-formaldehyde resole resin thus enables one to achieve both long term durability and a quicker build-up of flexural strength than with a size containing the same polyhydroxy compound but no phenol-formaldehyde resole.

Figure 3:
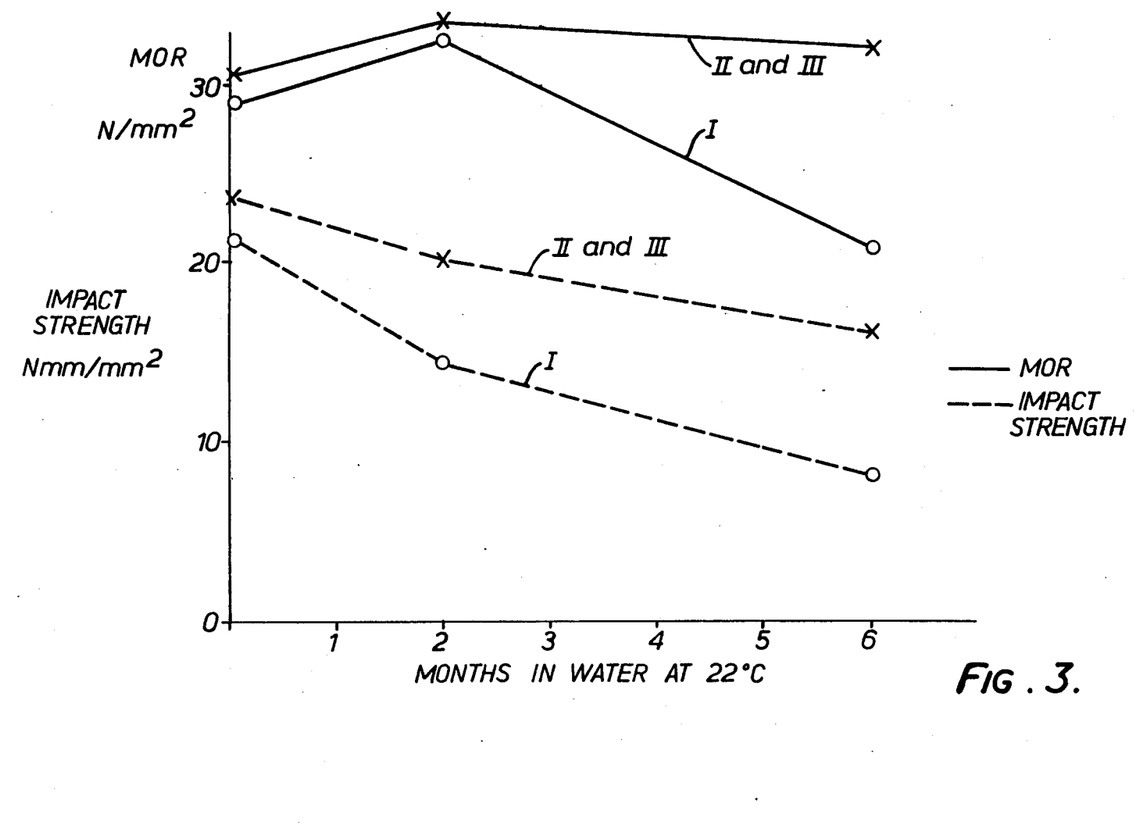
FIG. 3 is a graphical representation of the variation with time of the modulus of rupture and impact strength of glass fibre reinforced cement composites, when immersed in water at 22° C after curing for 28 days at 100% relative humidity.
Figure 4:
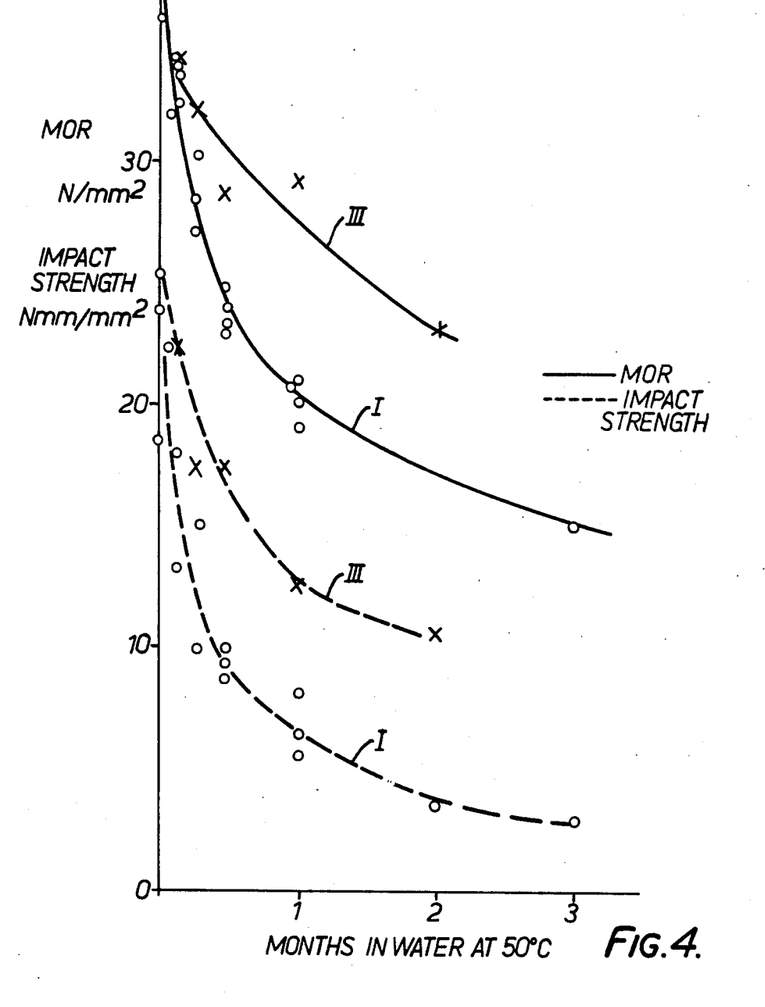
FIG. 4 is a similar graphical representation of the variation with time of the same characteristics when the composites, after the same curing, were immersed in water at 50° C.

FIGS. 3 and 4 show the impact strength and flexural strength as a function of time when three sets of test specimens of glass-fibre-reinforced cement, after curing for 28 days at 100% relative humidity and room temperature, were stored in water at 22° C and 50° C, respectively, using glass fibres of the composition set out above coated respectively with sizes II and III (containing the phenol-formaldehyde resole and pyrogallol) as compared with similar glass fibres coated with known size I. The results indicate a substantial improvement in strength retention produced by the use of sizes II and III as compared with the known size I. We believe that not only does the reduction in the immediate availability of the polyhydroxy compound (pyrogallol) to the matrix confer improvement in the curing stage but that it also improves the performance of the composite material, particularly under hot, wet storage conditions, e.g. at 50° C. In particular, while under wet conditions a size in accordance with British Application No. 31657/73, now published under U.K. Patent No. 1,465,059 such as IV, will give an improvement over a size such as I which does not contain a polyhydroxy compound in terms of impact strength, little significant improvement is obtained in flexural strength. Sizes II and III of the present invention produce an improvement in both impact strength and flexural strength, i.e. modulus of rupture.

Further experiments were made to investigate the optimum values for the mol ratio of the phenol-formaldehyde resole resin used in the size and for the temperature at which the size was dried and cured before incorporation of strands of the coated glass fibres into small cement blocks, the procedure being the same as that described above with reference to FIG. 1. The size used was in each case made up as size II described above. The resole resins used varied in phenol:formaldehyde ratio from 1:1.5 to 1:4.0. Size curing temperatures of 100° C, 120° C, 135° C and 180° C were used. Sets of test specimens were cured for 1 day at 100% relative humidity and room temperature before being stored in water at 50° C to produce accelerated ageing effects. The strands were tested for tensile strength after varying periods of storage, with the results set out in Table I.

TABLE 1

| Specimen Set No. | Resole Resin Mol Ratio Phenol:Formaldehyde | Size Curing Temperature | TENSILE STRENGTH (N/mm²) | | | |
|---|---|---|---|---|---|---|
| | | | 1 day 100% RH | + 14 days water at 50° C | + 28 days water at 50° C | 56 days water at 50° C |
| 1 | 1:1.5 | 120° C | 1288 | 836 | 728 | 620 |
| 2 | 1:2.0 | 120° C | 1161 | 863 | 733 | 634 |
| 3 | 1:3.0 | 120° C | 1242 | 843 | 913 | 760 |
| 4 | 1:4.0 | 120° C | 1256 | 870 | 679 | 602 |
| 5 | 1:2.65 | 120° C | 1350 | 1050 | 840 | 600 (77 days) |
| 6 | 1:2.65 | 180° C | 1103 | 919 | 703 (34 days) | 604 |
| 7 | 1:1.5 | 180° C | 1170 | 778 (13 days) | 632 (42 days) | 526 (54 days) |
| 8 | 1:2.65 | 160° C | 1244 | 847 | 735 (27 days) | 563 |
| 9 | 1:1.5 | 160° C | 1081 | 904 (13 days) | 640 (42 days) | 538 (54 days) |
| 10 | 1:2.65 | 135° C | 1022 | — | — | 434 (3 months) |
| 11 | 1:2.0 | 135° C | 1158 | — | — | 498 (3 months) |
| 12 | 1:2.65 | 100° C | 737 | 867 | 730 (34 days) | 532 |

It will be seen that best results were obtained with a phenol:formaldehyde mol ratio of 1:2.65 and a size curing temperature of 120° to 160° C.

Control experiments with glass fibres sized with the resole resin alone showed lower retention of flexural strength, confirming the need for both the polyhydroxy compound and the resole resin to achieve the purposes of the invention.

To confirm the utility of the phenol-formaldehyde resole resins in combination with other polyhydroxy compounds, further tests were made, again under the same conditions as those described with reference to FIG. 1, on coated glass fibre strands embedded in small blocks of cement, using sizes similar to size II described above, but incorporating different polyhydroxy compounds, together with a phenol-formaldehyde resole resin having a phenol:formaldehyde ratio of 1:2.6, the size being cured at 115° C for ½ hour.

Two sets of tests were carried out, the tensile strength of the strands being measured after 28 days in water at 50° C.

In the first set, whose results are tabulated below in Table 2, a size containing the resole resin only was used as the control.

TABLE 2

| Specimen | Size Composition | | Tensile Strength N/mm² | % improvement over control |
|---|---|---|---|---|
| 1. | Control Resole Resin only | | 592 | 0 |
| 2. | 1,2,3 trihydroxy benzene (pyrogallol) |  | 995 | 67 |
| 3. | Ammonium oxidation salt and pyrogallol | | 911 | 54 |
| 4. | 2,3,4 trihydroxy benzoic acid |  | 933 | 58 |

TABLE 2-continued

| Specimen | Size Composition | Tensile Strength N/mm² | % improvement over control |
|---|---|---|---|
| 5. | 2,4,6 trihydroxy benzoic acid (structure: benzene ring with three OH groups at 2,4,6 positions and COOH) | 858 | 44 |
| 6. | 2,3,4 trihydroxyacetophenone (structure: benzene ring with OH at 2,3,4 positions and COCH₃) | 848 | 43 |

These results clearly show the improvement produced by the incorporation of both the polyhydroxy compound and the resole resin.

In the second set of tests, whose results are tabulated in Table 3, sizes similar to size IV described above were used for comparison, containing the respective polyhydroxy compounds without any resole resin. Conventional size I was used as a control.

TABLE 3

| Specimen | Size Composition | Tensile Strength N/mm² | % improvement over control |
|---|---|---|---|
| 1. | Size I alone | 610 | 0 |
| 2. | 1,2,3 trihydroxy benzene (pyrogallol) | 970 | 59 |
| 3. | 2,3,4 trihydroxy benzoic acid | 826 | 35 |
| 4. | 2,4,6 trihydroxy benzoic acid | 723 | 18 |
| 5. | 2,3,4 trihydroxy-acetophenone | 573 | −6 |

It will be seen that the percentage improvements achieved by use of the polyhydroxy compounds above are significantly less than the improvements achieved with the addition of the resole resin, as in Table 2.

We claim:

1. Glass fibres for use as reinforcement in inorganic cementitious products, said fibres being coating with a composition containing at least one monocyclic or polycyclic aromatic compound which has at least three hydroxyl groups on the aromatic ring or, in a polycyclic compound, on at least one of the aromatic rings, and at least one partially-cured water-dilutable A-stage phenol-formaldehyde resole resin.

2. Coated glass fibres according to claim 1, said fibres being formed from an alkali-resistant glass of the SiO—ZrO -R O-R'O type, wherein R is selected from Na, K and Li and R' is selected from the alkaline earths, Zn and Mn, said glass containing at least 5 mol % ZrO.

3. Coated glass fibres according to claim 2, formed from a glass of the following composition in mol %:
$SiO_2$: 69%
$ZrO_2$: 9%
$Na_2O$: 15.5%
$CaO$: 6.5%

4. Inorganic cementitious products reinforced with coated glass fibres according to claim I.

5. A method of coating glass fibres to reduce their rate of deterioration when incorporated in inorganic cementitious products, comprising applying to the glass fibres a coating composition containing at least one monocyclic or polycyclic aromatic compound which has at least three hydroxyl groups on the aromatic ring, or in a polycylic compound, on at least one of the aromatic rings, and at least one partially-cured water-dilutable A-stage phenol-formaldehyde resole resin.

6. A method according to claim 5, wherein the coating composition is applied as a size to the individual glass fibres immediately after they have been drawn from the molten glass composition.

7. A method of forming a glass fibre reinforced inorganic cementitious product, wherein glass fibres are coated with a composition containing at least one monocyclic or polycyclic aromatic compound which has at least three hydroxyl groups on the aromatic ring or, in a polycyclic compound, on at least one of the aromatic rigs, and at least one partially-cured water-dilutable A-stage phenol-formaldehyde resole resin, and the glass fibres are subsequently incorporated into a cemetitious matrix.

8. Glass fibres according to claim 1, wherein the A-stage phenol-formaldehyde resole resin is the product of reaction of 1 mol phenol with more than 1.5 moles formaldehyde in aqueous solution in the presence of an alkaline catalyst.

9. Glass fibres according to claim 8, wherein the resole resin is the product of reaction of 1 mol phenol with from 1.5 to 3.7 moles formaldehyde.

10. Glass fibres according to claim 9, wherein the resole resin is the product of reaction of 1 mol phenol with 2 to 3 moles formaldehyde.

11. Glass fibres according to claim 1, wherein the polyhydroxy aromatic compound is pyrogallol.

12. Glass fibres according to claim 1, for use as a size, further containing a linking agent.

13. Glass fibres according to claim 12, wherein the linking agent is silane.

14. A size composition according to claim 12, which is water-based, further containing a wetting agent.

* * * * *